US012060889B1

(12) United States Patent
Demski et al.

(10) Patent No.: US 12,060,889 B1
(45) Date of Patent: Aug. 13, 2024

(54) HIGH-SPEED PRESSURIZED IMPELLER DISK

(71) Applicant: P 3 Technologies, LLC, Jupiter, FL (US)

(72) Inventors: Brandon A Demski, Jupiter, FL (US); Robert W Sanders, Stuart, FL (US)

(73) Assignee: P3 TECHNOLOGIES, LLC, Jupiter, FL (US)

(*) Notice: Subject to any disclaimer, the term of this patent is extended or adjusted under 35 U.S.C. 154(b) by 0 days.

(21) Appl. No.: 16/866,623

(22) Filed: May 5, 2020

(51) Int. Cl.
*F04D 29/22* (2006.01)
*F01D 5/14* (2006.01)

(52) U.S. Cl.
CPC ......... *F04D 29/2222* (2013.01); *F01D 5/147* (2013.01); *F05B 2240/301* (2013.01); *F05D 2240/301* (2013.01); *F05D 2260/941* (2013.01)

(58) Field of Classification Search
CPC .. F04D 29/041; F04D 29/0416; F04D 29/051; F04D 29/0516; F04D 29/2211; F04D 29/2222; F04D 29/2227; F04D 29/2266; F04D 29/28; F04D 29/284; F05D 2240/301; F05D 2260/941; F01D 5/147; F05B 2240/301
USPC .......... 415/105, 106; 416/90 R, 91, 92, 93 R
See application file for complete search history.

(56) References Cited

U.S. PATENT DOCUMENTS

| | | | | |
|---|---|---|---|---|
| 4,787,821 A * | 11/1988 | Cruse | F04D 29/023 416/185 |
| 10,710,160 B2 * | 7/2020 | Army | F04D 29/284 |
| 2007/0224047 A1 * | 9/2007 | Falk | F04D 29/284 416/97 R |
| 2017/0189966 A1 * | 7/2017 | Giannozzi | F04D 29/2222 |
| 2018/0355883 A1 * | 12/2018 | Pulnikov | B33Y 80/00 |

* cited by examiner

*Primary Examiner* — Courtney D Heinle
*Assistant Examiner* — Danielle M. Christensen
(74) *Attorney, Agent, or Firm* — P G Scott Born; FISHERBROYLES, LLP

(57) ABSTRACT

A centrifugal impeller includes a pressurized cavity that reduce the stresses in the impeller disk, blades, shroud and hub as the stiffness of the rotor is not compromised while weight is reduced across the component and peak stress regions are shifted across the part. The centrifugal impeller can be a centrifugal pump or a radial inflow turbine. The pressurized cavity is formed between a forward wall and an aft wall of the impeller and can include a plurality of orifices that open into the cavity to supply pressure from low to high pressure location around the impeller. Annular rings can be used within the cavity to stiffen the impeller. Radial and tangential stiffening ribs can be used on the two walls to stiffen the impeller.

3 Claims, 6 Drawing Sheets

HIGH-SPEED PRESSURIZED IMPELLER DISK

CROSS REFERENCE TO RELATED APPLICATIONS

None.

GOVERNMENT LICENSE RIGHTS

None.

BACKGROUND OF THE INVENTION

Field of the Invention

The present invention relates generally to pumps, compressors, and turbines, and more specifically centrifugal pump impellers and radial turbines.

Description of Related Art Including Information Disclosed Under 37 CFR 1.97 and 1.98

To achieve significant pressure-rise in a pump traditionally requires multiple impellers; also known as stages. This is both cost prohibitive and weight penalizing as the system part count increases with each subsequent impeller. Utilizing a single impeller to achieve the pressures that multiple impellers produce requires extremely high rotor speeds, which result in highly stressed impeller disks and blades, which ultimately limit the maximum pressure and life of the impeller. This stress is principally a function of the impeller's angular momentum which forces the mass outwards radially, creating high stress concentrations at regions where minimal movement occurs relative to the forces exerted and the adjoining geometry.

Traditional designs of high pressure-rise impellers rely on reducing the mass of the impeller disk, in turn lowering the stresses of the impeller along the disk, blades, hub, and shroud. While this weight reduction works to an extent, a point of diminishing returns is achieved where the impeller cannot support the torque and pressure exerted upon itself by the fluid it is pumping. This condition is defined as the tip speed limit of an impeller and is historically a combination of impeller material density and fluid dependent due to temperature, density, and viscosity of the acting medium on the impeller hydro surfaces.

BRIEF SUMMARY OF THE INVENTION

A centrifugal impeller that employs an internal pressurized cavity can reduce the stresses in the impeller disk, blades, shroud and hub as the stiffness of the rotor is not compromised while weight is reduced across the component and peak stress regions are shifted across the part. This is due to the pressure acting in the same way a balloon does to support itself via pressure acting against the deflections naturally experienced under high rotor speed. The impeller can be a centrifugal pump or a radial inflow turbine. The pressurized cavity can be pressurized by a number of orifices that open into a pressurized section of the impeller, either thru the hub, the aft wall, the forward wall, or the tip in order to adjust the pressure in the cavity from relatively low to relatively high. the impeller can include annular rings extending between the aft wall and the forward wall thru the pressurized cavity to stiffen the impeller. A plurality of beams or baffles can also be used to stiffen the impeller.

Radial and tangential stiffening ribs on the aft and forward walls can also be used to stiffen the impeller.

DETAILED DESCRIPTION OF THE INVENTION

The amount of pressure that an impeller can generate is limited by one principle feature, the tip speed of the impeller. As the tip speed is increased, the discharge pressure increases with the square of this velocity change. Consequently, the stresses in the impeller increase by the square of this tip speed change as well. Failure for conventional designs is limited by the life margin, wherein the stresses in the part will cause the impeller to fatigue and fracture given enough operating time. In high performance expendable systems, such as rocket engines, the life is not the issue but the maximum speed at which they can operate. In either of these cases, long life or high performance, decreasing the stress in the impeller allows for higher tip speeds, and in turn higher pressures. With the utilization of the pressurized impeller disk the same life and structural margins can be achieved in comparison to the historical designs while developing greater pressures.

The pressurized impeller disk of the present invention is a way to both stiffen and lighten the impeller disk. Stress in the impeller increases with speed via three main factors: 1) the increasing pressure of the fluid, 2) the torque generated on the impeller via the fluid pumping, and 3) the increasing angular momentum of the impeller. Since the pressure is a desirable outcome and the torque a byproduct of this, the only way to combat the stresses is via angular momentum. Angular momentum has two main components: velocity and weight. Since velocity is a fixed value, only weight can be addressed. By reducing the weight, the stresses can be reduced proportionally. Historically, this is achieved by thinning the impeller disk to reduce stresses until such a point that the pressure loading and deflections overcome the stiffness imparted by the disk, resulting in an increasing stress with further thinning of the material. This is conceptually shown as a parabolic stress/weight curve with an ideal design point at the inflection for minimum stress. This approach results in an optimal design but produces high stress concentrations at principle locations in the impeller due to the planar nature of the disk. By employing an internal pressurized cavity, the weight can be shifted and reduced strategically. This allows for strain energy to be directed more controllably to create a more uniform stress profile across the entire impeller, resulting in a significantly reduced parabolic stress/weight curve and inflection point. This allows for lower stress, longer life, and higher performance impellers. This technology is not limited to just impellers for pumps either, radial inflow turbines, essentially a centrifugal pump in reverse, also benefit equivalently from this approach. Thus, for purposes of the description of the present invention, an impeller can be a centrifugal pump or a radial inflow turbine.

Figure 1:
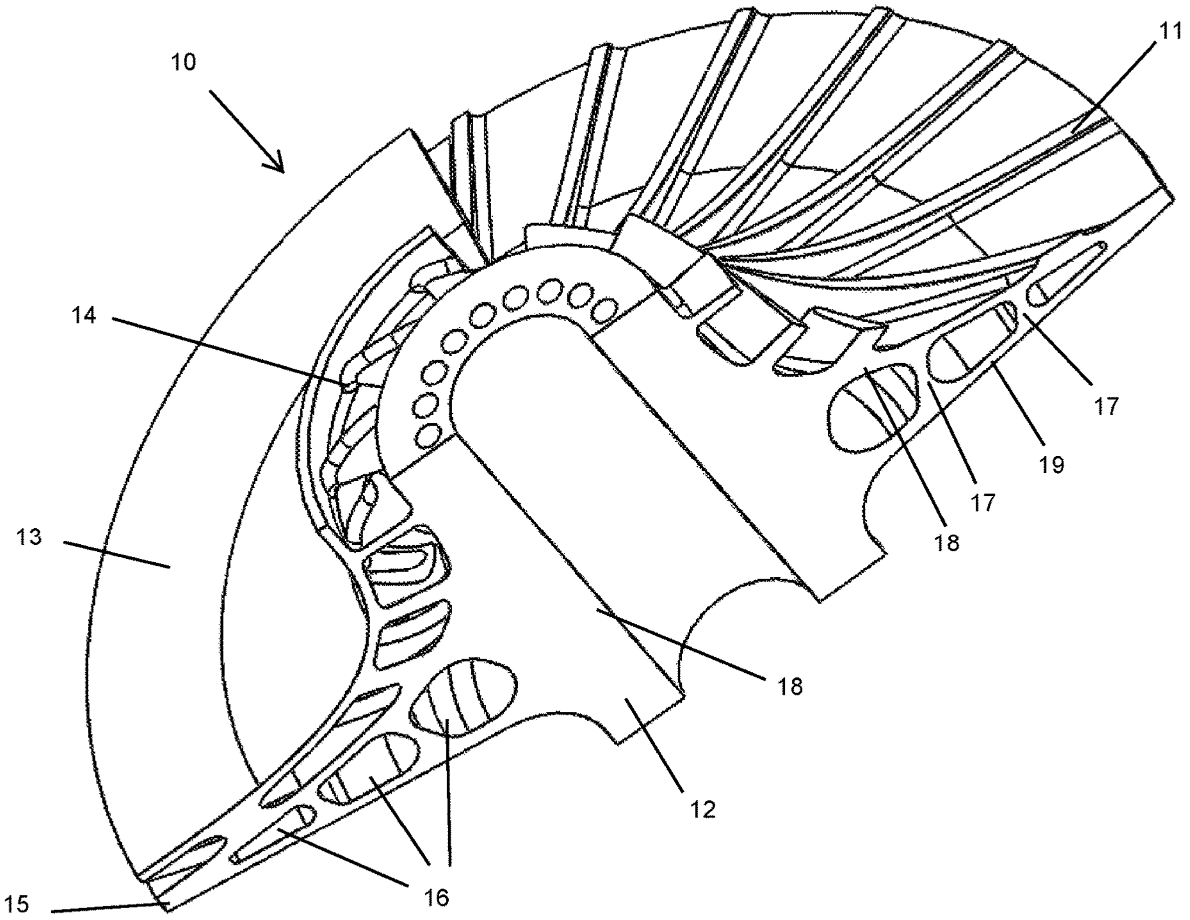
FIG. 1 is an isometric view of the high-speed pressurized impeller disk with the pressurized cavity of the present invention, and internal annular rings used to stiffen the cavity.

An embodiment of the pressurized impeller disk 10 is shown in FIG. 1. This is the generalized configuration of an impeller employing the technology. The key main features of any impeller are the blades (11) which create the pressure rise, the hub (12) which attach the impeller to the shaft, in some impeller designs the shroud (13) which increases impeller efficiency, the eye (14) which acts as the impeller inlet, and the tip (15) where the flow exits the impeller 10. In a radial turbine, all these features are the same except the tip (15) becomes in the inlet and the eye (14) acts as the outlet. When referencing impeller orientation, there is the forward side of the impeller, the side in which the eye (14) and the shroud (13) reside, and the aft side, opposite of the eye (14) and the shroud (13). The pressurized impeller cavity (16) sits aft of the blades (11), and acts as the main stress reducing and manipulating feature of the present invention and in this embodiment contains an annular ring internal support structure (17) as well. The support structure (17) is positioned between the forward cavity wall (18) and the aft cavity wall (19).

Figure 2:
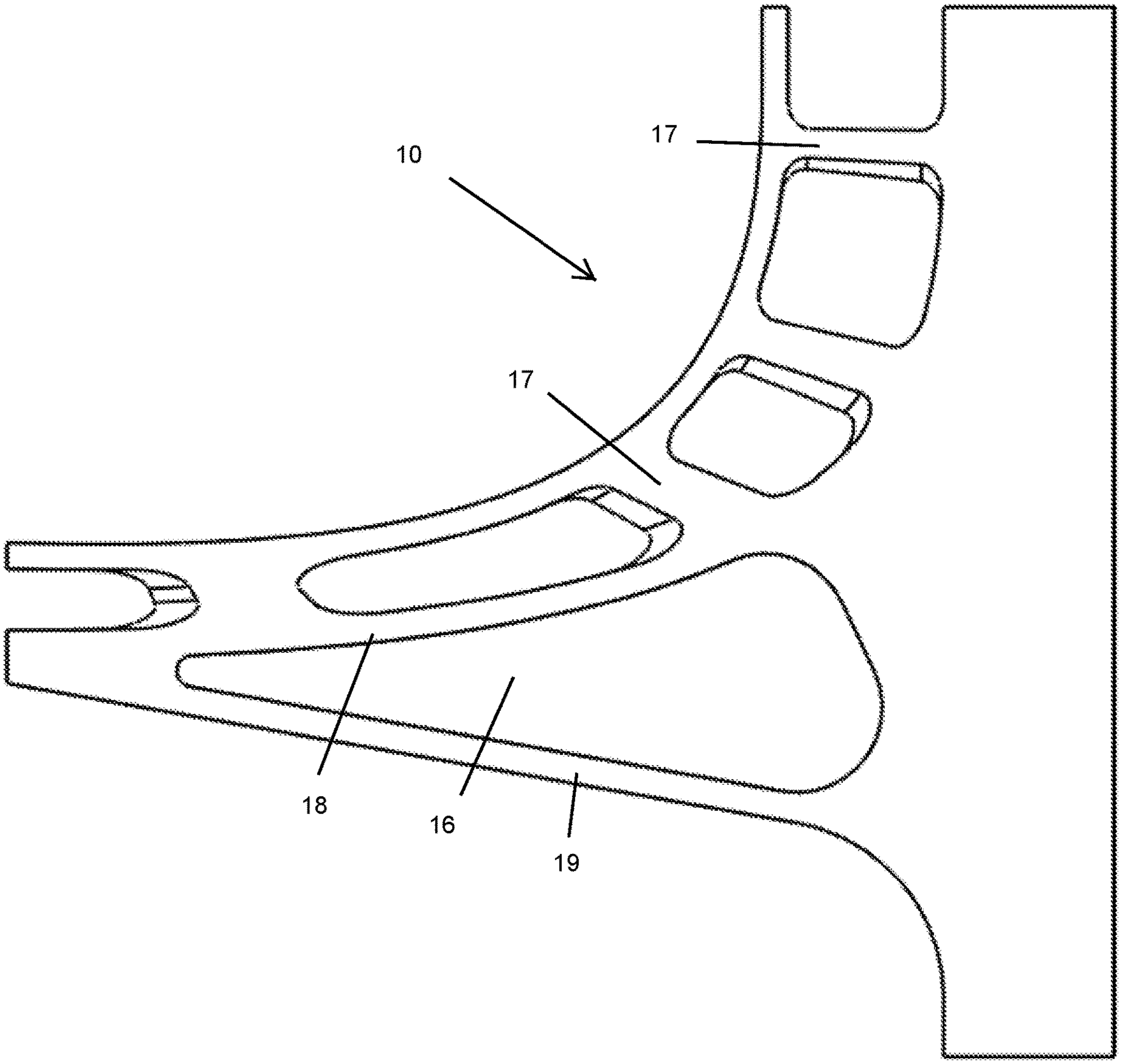
FIG. 2 shows a cross section view of the pressurized impeller disk of the present invention without any internal support features within the cavity.

FIG. 2 is a cross-sectional view of the pressurized impeller (10) detailed in FIG. 1, without any support structure inside the pressurized cavity (16). This cavity detailed herein is fully sealed. Utilizing a fully sealed cavity allows for this pocket to be isobaric, constantly providing the stiffening independent of external forces. The pressure residing in this cavity (16) can be tuned during manufacturing for structural or rotordynamic applications.

Figure 3:
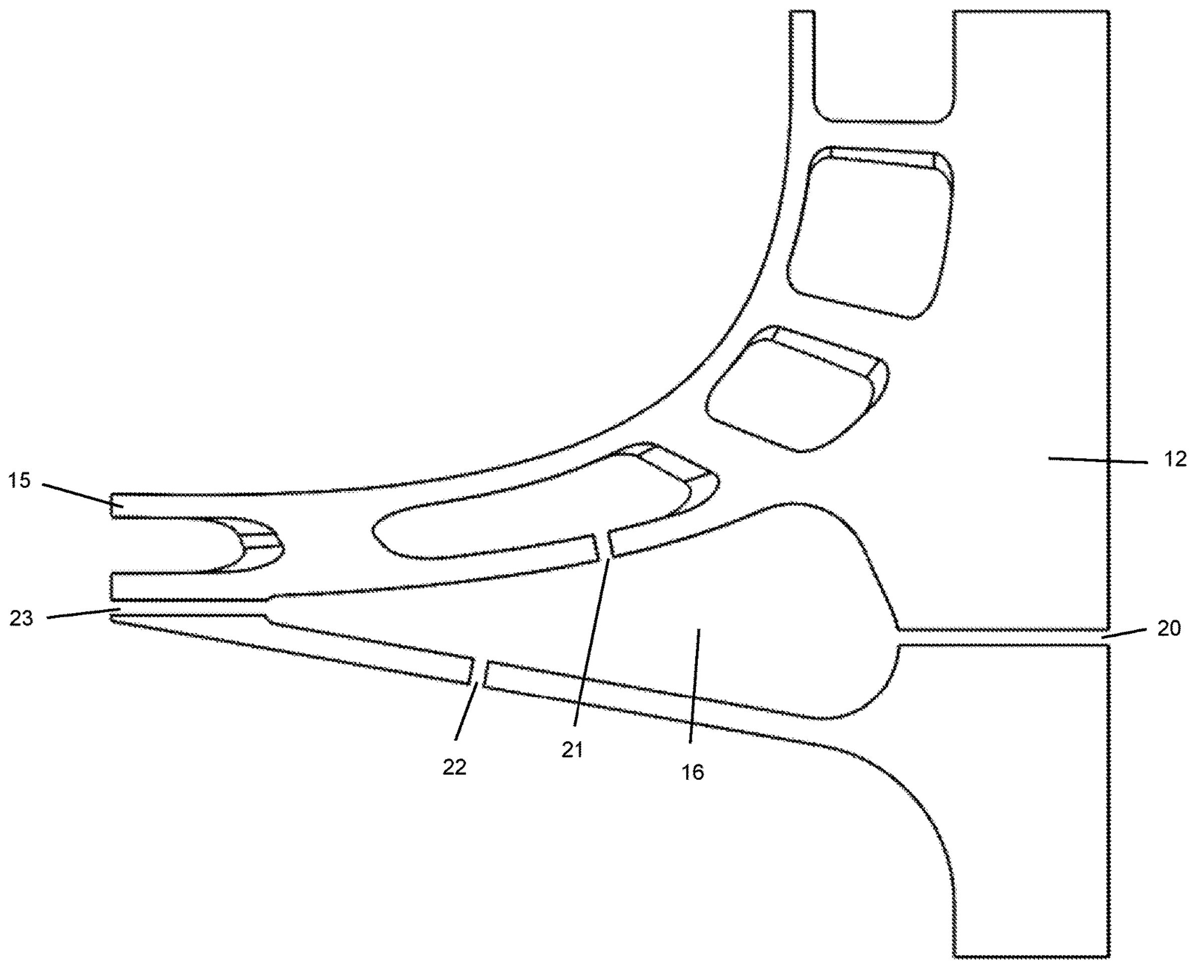
FIG. 3 is a cross section view that details the various ways in which the pressurized impeller disk of the present invention can be supplied or vented to the exterior of the impeller cavity thru orifices.

The pressurized cavity (16) of FIG. 3 is like that of FIG. 2, except that there are now orifices that allow the cavity (16) to either be supplied or vented to external sources. Examples shown herein are a hub orifice (20) thru the hub (12), forward face orifice (21) thru the forward face or wall (18), aft face orifice (22) thru the aft face or wall (19), and impeller tip orifice (23) thru the impeller tip (15). Orifice location is dependent upon desired cavity pressure, as the further radially outward along a radial axis of the impeller (10), the higher the velocity of the impeller is, which in turn results in a higher pressure supplied by the orifice. The hub orifice (20) would provide the lowest pressure source, with the forward (21) and aft (22) orifices providing moderate pressure, and the tip orifice (23) providing peak pressure.

Figure 4:
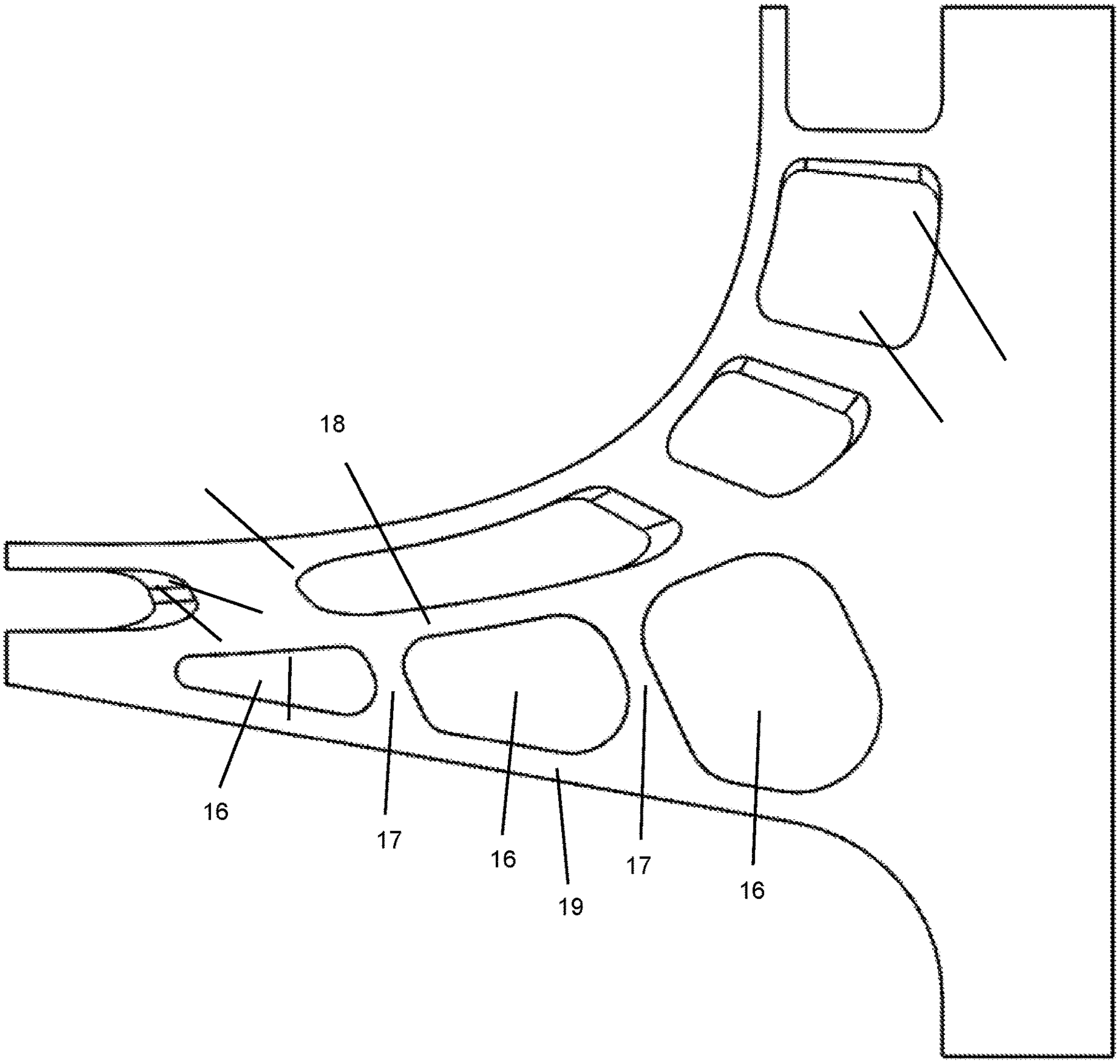
FIG. 4 is an example of the pressurized impeller cavity of the present invention that contains internal annular support structures for stiffening of the disk and the aft wall.

In cases where an axially persistent cavity cannot sustain the desired stress requirements, FIG. 4 details the cross-section of an internal support structure to direct the stresses within the pressurized cavity (16) to specific regions. The embodied support structure utilizes annular rings (27) to adjoin the forward (18) and aft (19) walls of the pressure cavity (16) at a constant radial position along each face, creating a circumferential box-like structure of the hollow passage.

Figure 5:
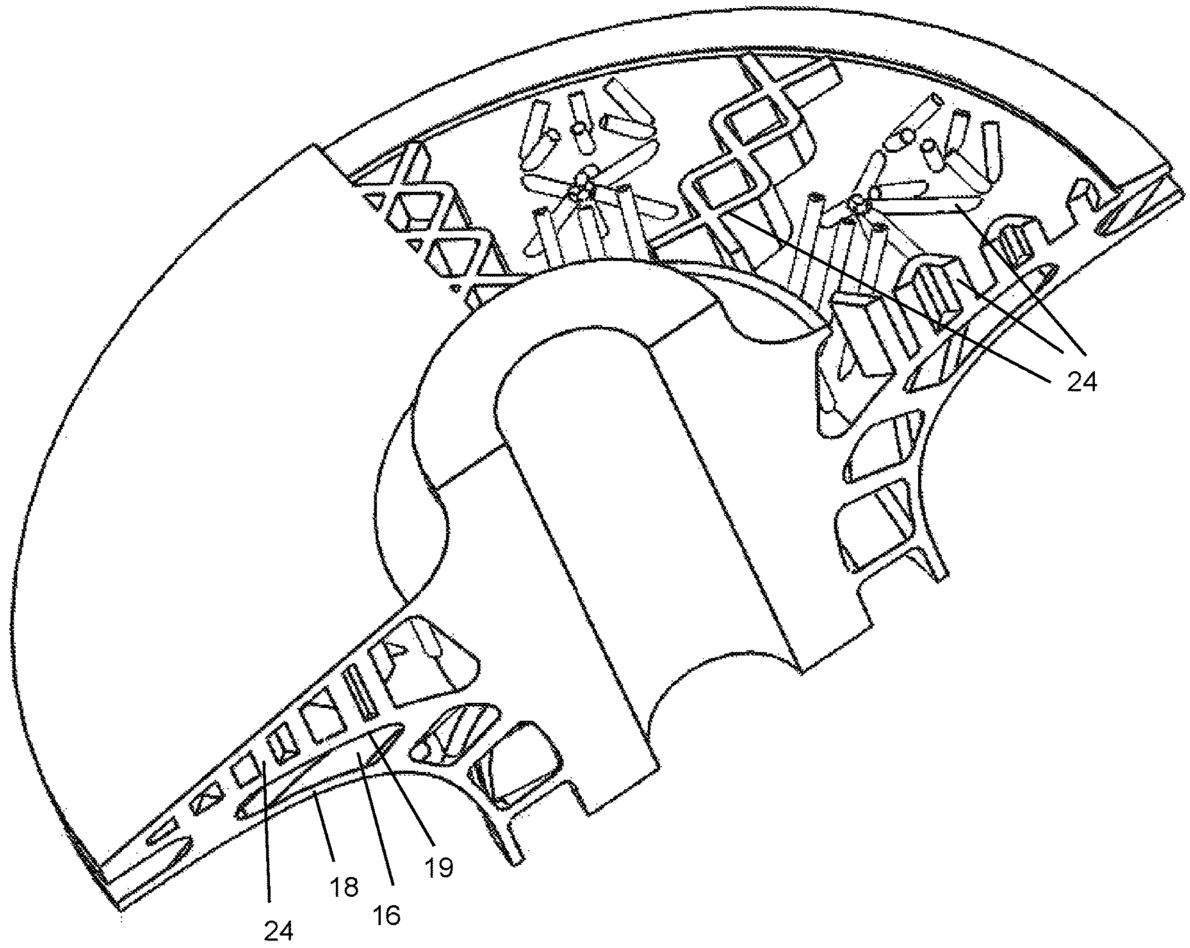
FIG. 5 is an isometric view of the pressurized impeller of the present invention that utilizes an internal truss structure within the pressurized cavity to stiffen the disk and the aft wall.

FIG. 5 embodies an impeller where the internal support structure for stress reduction is not functioning in an axi-symmetric fashion and is a unique 3-dimensional truss structure. The individual beams or baffles (24) adjoin the forward wall (18) and aft wall (19) much like the prior embodiments, but with each beam or baffle (24) attaching at specific points on each wall or face circumferentially and not in a constant fashion. This allows for a more pinpoint direction of stresses in the 3D space as opposed to a purely circumferential application. The beams act as a singular load path for transference of force, whereas the baffles act as a high aspect ratio beam following a continuous profile. Beams would be used for areas of very localized stress, such as those seen in the leading edge of a blade. Baffles would be used across continuous stress regions, such as those seen on the leeward side of the blade relative to rotation.

Figure 6:
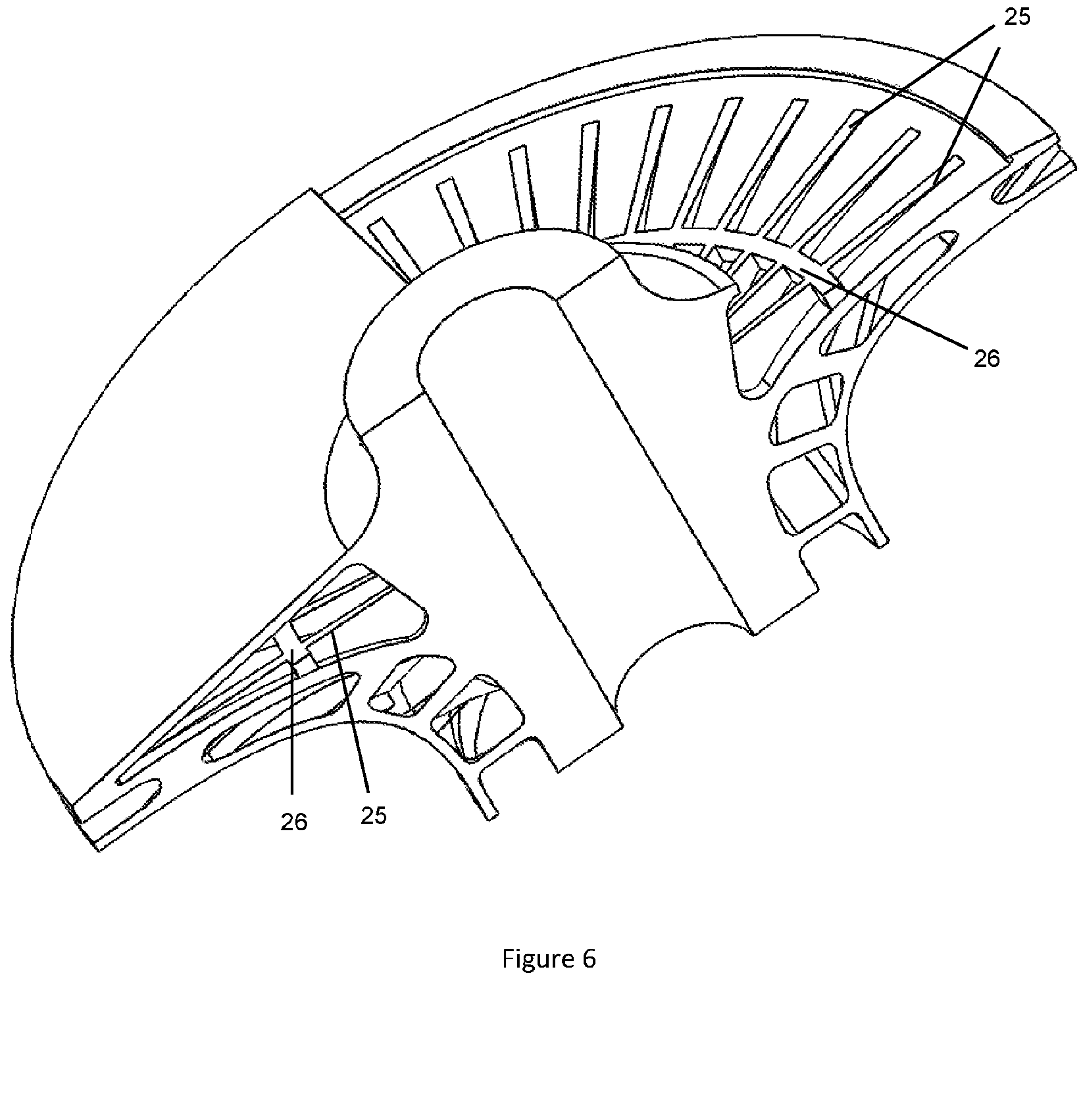
FIG. 6 details the use of ribs and spars for the stiffening of the disk in the pressurized impeller of the present invention.

Internal stiffening ribs are shown in FIG. 6. These ribs include radial stiffening ribs (25) and tangential stiffening ribs (26). These ribs, which are oriented radially (15), tangentially (16), or a combination of the two are used to stiffen each face or wall (18) and (19) independently of one another. These ribs (15, 16) act to control the stress and deflection of an individual face or wall (18, 19) without shifting the strain energy to the opposite face. However, in specific scenarios as the design necessitates, ribs (15, 16) would adjoin the two faces or walls (18, 19).

We claim the following:

1. A pressurized impeller comprising:

a hub;

an axial opening;

a radial opening;

the axial opening and the radial opening being connected within the pressurized impeller to form a plurality of fluid flow paths, the plurality of fluid flow paths being formed within the pressurized impeller between a forward wall and an aft wall; and, an internal pressurized cavity formed between the forward wall and the aft wall, the cavity excluding any support structure between the forward wall and aft wall, wherein the cavity is fully sealed.

2. The pressurized impeller of claim 1, and further comprising:

the pressurized impeller is a centrifugal pump.

3. The pressurized impeller of claim 1, and further comprising:

the pressurized impeller is a radial inflow turbine.

* * * * *